US009726916B2

(12) United States Patent
Yamaguchi et al.

(10) Patent No.: US 9,726,916 B2
(45) Date of Patent: Aug. 8, 2017

(54) MEMBER BONDING APPARATUS

(71) Applicant: Origin Electric Company, Limited, Saitama-shi, Saitama (JP)

(72) Inventors: Koji Yamaguchi, Saitama-shi, Saitama (JP); Yutaka Matsumoto, Saitama-shi, Saitama (JP); Hisashi Shimizu, Saitama-shi, Saitama (JP); Tetsuya Okamoto, Saitama-shi, Saitama (JP)

(73) Assignee: Origin Electric Company, Limited, Saitama (JP)

( * ) Notice: Subject to any disclaimer, the term of this patent is extended or adjusted under 35 U.S.C. 154(b) by 0 days.

(21) Appl. No.: 14/764,888

(22) PCT Filed: Jan. 28, 2014

(86) PCT No.: PCT/JP2014/051769
§ 371 (c)(1),
(2) Date: Jul. 30, 2015

(87) PCT Pub. No.: WO2014/119542
PCT Pub. Date: Aug. 7, 2014

(65) Prior Publication Data
US 2015/0370098 A1   Dec. 24, 2015

(30) Foreign Application Priority Data

Jan. 30, 2013 (JP) ................................. 2013-015851
Jan. 30, 2013 (JP) ................................. 2013-015852
Jan. 30, 2013 (JP) ................................. 2013-015853

(51) Int. Cl.
*G02F 1/13* (2006.01)
*G02F 1/1333* (2006.01)

(52) U.S. Cl.
CPC ...... *G02F 1/1303* (2013.01); *G02F 1/133308* (2013.01); *G02F 2001/133325* (2013.01); *G02F 2001/133331* (2013.01); *Y10T 156/17* (2015.01)

(58) Field of Classification Search
CPC . B32B 41/00; B32B 2041/04; B32B 2305/55; B32B 2457/20; B32B 2457/202;
(Continued)

(56) References Cited

U.S. PATENT DOCUMENTS

2002/0062787 A1   5/2002   Hashizume et al.
2003/0159769 A1*  8/2003   Ogimoto ............. B32B 38/1841
                                                                 156/64

(Continued)

FOREIGN PATENT DOCUMENTS

JP    2001-195784    7/2001
JP    2010-024321    2/2010
(Continued)

OTHER PUBLICATIONS

Invitation to Respond to Written Opinion, Written Opinion, and Search Report mailed on Jun. 2, 2016 in Singapore patent application No. 11201505870T, 10 pages.
(Continued)

*Primary Examiner* — George Koch
(74) *Attorney, Agent, or Firm* — Squire Patton Boggs (US) LLP

(57) ABSTRACT

To provide a member bonding apparatus that can accurately position two members for bonding. Member alignment preprocessing device 15 adjusts to align one of the two members received by member receiving device 11 with another member in X and Y-axis directions so that the positions of bonding surfaces of the two members approximately correspond, adhesive application device 12 applies adhesive to a bonding surface of one of the two members approximately aligned, member alignment device 16 adjusts (Continued)

to align another member with one of the two members in X, Y, Z-axis and α, β, θ-axis directions based on images of the two members captured by a CCD camera so that positions of the bonding surfaces of the two members correspond, member bonding device 13 makes the bonding surfaces of the two members aligned be bonded to each other through the adhesive, and member delivery device 14 unloads and delivers the bonded member.

3 Claims, 9 Drawing Sheets

(58) Field of Classification Search
CPC ........ B32B 2457/204; B32B 2457/206; B32B 2457/208; G02F 1/1303; G02F 1/133308; G02F 2001/133325; G02F 2001/133331; Y10T 156/17
USPC ........ 156/351, 356, 360, 367, 378, 379, 538
See application file for complete search history.

(56) References Cited

U.S. PATENT DOCUMENTS

| | | | |
|---|---|---|---|
| 2008/0040916 | A1 | 2/2008 | Shim |
| 2008/0047651 | A1* | 2/2008 | Park .......................... B30B 1/34 156/60 |
| 2010/0139836 | A1* | 6/2010 | Horikoshi ......... H01L 21/67092 156/64 |
| 2011/0177261 | A1* | 7/2011 | Ishii .................. G02F 1/133308 428/1.5 |

FOREIGN PATENT DOCUMENTS

| | | |
|---|---|---|
| JP | 2010-282099 | 12/2010 |
| JP | 2011-067802 | 4/2011 |
| JP | 2011-100118 | 5/2011 |
| JP | 2012-032548 | 2/2012 |

OTHER PUBLICATIONS

Tinh, Bui Cong. "Thermal Transport Properties of Individual Nanowires", *PhD Thesis*, 2011, 194 pages.

Artyukhov, Vasilii I. Abstract of "A six degree of freedom nanomanipulator design based on carbon nanotube bundles", *Nanotechnology*, Aug. 27, 2010, vol. 21, No. 38, 3 pages.

* cited by examiner

MEMBER BONDING APPARATUS

This application is 371 of PCT/JP2014/051769, filed on Jan. 28, 2014

TECHNICAL FIELD

The present invention relates to member bonding apparatuses in which two members are bonded using an adhesive to make a bonded member.

BACKGROUND ART

As an apparatus for bonding two members such as a liquid crystal panel and a cover glass, for example, using the adhesive to make the bonded member there has been known an apparatus for applying the adhesive to part of a bonding surface of one of the two flat members, mating the bonding surfaces of the two flat members to bring the adhesive into contact with the other member, and pressing the two flat members to spread the adhesive (for example, see Patent Document 1).

In addition, as an apparatus for bonding two members such as a liquid crystal panel and a cover glass, for example, using the adhesive to manufacture the bonded member there has been known an apparatus for applying the adhesive to part of a bonding surface of one of the two flat members, mating the bonding surfaces of the two flat members to bring the adhesive into contact with the other member, and pressing the two flat members to spread the adhesive (for example, see Patent Document 1). There has been another apparatus configured to irradiate the adhesive with ultraviolet light to increase the viscosity and spread enough liquid resin between the members (see Patent Document 2, for example).

FIG. 14 is a block diagram, showing an example of conventional member bonding apparatuses. A member receiving device 11 has a jig for receiving two members to be bonded, and the members are mounted in alignment with the position of the jig. An adhesive application device 12 applies the adhesive to the bonding surface of one of the two members received by the member receiving device 11, and the amount of the adhesive the thickness of which becomes constant is applied. A member bonding or joining device 13 bonds the one member to which the adhesive is applied by the adhesive application device 12 with the other member to make a bonded member. A member delivery device 14 delivers the bonded member made in the member bonding device 13. Some member delivery devices 14 have a storage part for storing the bonded member temporarily.

PRIOR ART DOCUMENT

Patent Document

[PTL 1] Japanese Patent Application Publication No. 2010-24321
[PTL 2] Japanese Patent Application Publication No. 2011-67802

DISCLOSURE OF INVENTION

Problem to be Solved by the Invention

Although the conventional apparatus positions and arranges two members to be bonded to a certain degree, the positioning is done by a member alignment device or a receiving jig, for example, and is not always accurate. Thus, there is a limit to the accurate bonding of two members. If two members are bonded out of alignment, the quality of the bonded member will decrease.

In the conventional apparatus, bonding is conducted so that the thickness of the bonded member formed by bonding two members becomes constant. Thus, if the members vary in thickness, then the thickness of the adhesive between two members fails to be constant and may be varied. In order to improve the quality, the thickness of the adhesive between two members is required to maintain constant.

In the case of the bonded member where the liquid crystal panel and the cover glass are bonded with the adhesive to form a touch panel, for example, pressing force against the cover glass is detected through the adhesive, and thus the detection sensitivity for the pressing force can be irregular when the thickness of the adhesive varies. This may causes incorrect detection or an error in detection of the pressing force.

On the other hand, the devices disclosed in the Patent Documents 1 and 2 do not take measures to prevent the adhesive from squeezing out of the edge of the member when two members are bonded, and thus the adhesive needs to be spread out to the edge over time. That is to say, the adhesive needs to be spread out to the edge over time so that the adhesive cures almost properly when the adhesive spreads out to the edge. Thus, the formation of the bonded member in which two members are bonded takes time.

A first object of the present invention is to provide a member bonding apparatus that can position two members for bonding with high accuracy.

A second object of the present invention is to provide a member bonding apparatus that can keep the thickness of the adhesive for bonding two plate members constant.

A third object of the present invention is to provide a member bonding apparatus that can make the bonded member while preventing the adhesive from squeezing out of the edge of the bonded member, even in the state where the adhesive fails to cure.

Means for Solving the Problem

A member bonding apparatus of aspect 1, comprises a member receiving device for receiving two members to be bonded, a member alignment preprocessing device for adjusting to align one member of the two members received by the member receiving device with another member in X and Y-axis directions so that the positions of bonding surfaces of the two members approximately correspond, an adhesive application device for applying an adhesive to a bonding surface of one member of the two members that are approximately aligned by the member alignment preprocessing device, a member alignment device for adjusting to align one member of the two members with another member in X, Y, Z-axis directions and α, β, θ-axis directions in accordance with images of the two members captured by a mounted CCD camera so that positions of the bonding surfaces of the two members correspond, a member bonding device for making the bonding surfaces of the two members aligned by the member alignment device be bonded to each other through the adhesive; and a member delivery device for unloading and delivering the bonded member that is bonded by the member bonding device.

A member bonding apparatus of aspect 2, comprises a member receiving device for receiving two members to be bonded, a thickness measuring device for measuring thicknesses of the two members received by the member receiving device, a member alignment preprocessing device for adjusting to align one member of the two members measured by the thickness measuring device with another member in X, Y-axis directions so that the positions of bonding surfaces of the two members approximately correspond, an adhesive application device for applying an adhesive to a bonding surface of one member of the two members that are approximately aligned by the member alignment preprocessing device, a member alignment device for adjusting to align one member of the two members with another member in X, Y, Z-axis directions and $\alpha$, $\beta$, $\theta$-axis directions in accordance with images of the two members captured by a mounted CCD camera so that the positions of the bonding surfaces of the two members correspond, a thickness adjusting device for adjusting a thickness of a bonded member in accordance with the thicknesses of the two members measured by the thickness measuring device so that the thickness of the adhesive in the bonded member, which is formed when two members aligned by the member alignment device are bonded, achieves a predetermined thickness, a member bonding device for making the bonding surfaces of the two members be bonded through the adhesive so that the bonded member has a thickness adjusted by the thickness adjusting device; and a member delivery device for unloading and delivering the bonded member bonded in the member bonding device.

A member bonding apparatus of aspect 3, comprises a member receiving device for receiving two members to be bonded, a thickness measuring device for measuring thicknesses of the two members received by the member receiving device, a member alignment preprocessing device for adjusting to align one member of the two members measured by the thickness measuring device with another member in X, Y-axis directions so that the positions of bonding surfaces of the two members approximately correspond, an adhesive application device for applying an adhesive to a bonding surface of one member of the two members that are approximately aligned by the member alignment preprocessing device, a member alignment device for adjusting to align one member of the two members with another member in X, Y, Z-axis directions and $\alpha$, $\beta$, $\theta$-axis directions in accordance with images of the two members captured by a mounted CCD camera so that the positions of the bonding surfaces of the two members correspond, a thickness adjusting device for adjusting a thickness of a bonded member in accordance with the thicknesses of the two members measured by the thickness measuring device so that the thickness of the adhesive in the bonded member, which is formed when the two members aligned by the member alignment device are bonded, achieves a predetermined thickness, a member tilt adjusting device for determining tilts of the members, adjusting the members in $\alpha$, $\beta$, $\theta$-axis directions, and adjusting the tilts of the two members so that the members are kept level, in accordance with the thicknesses of the members measured by the thickness measuring device at plural points, a member bonding device for making the bonding surfaces of the two members be bonded through the adhesive so that the bonded member has a thickness adjusted by the thickness adjusting device at tilt positions of the member adjusted by the member tilt adjusting device; and a member delivery device for unloading and delivering the bonded member bonded in the member bonding device.

A member bonding apparatus of aspect 4 is the member bonding apparatus according to any one of aspects 1 through 3, further comprising an adhesive curing preprocessing device for irradiating an edge of the bonded member, bonded with the member bonding device, with ultraviolet light through a mask and curing the adhesive at the edge of the bonded member, wherein the member delivery device unloads and delivers the bonded member in which the adhesive at the edge of the bonded member is cured by the adhesive curing preprocessing device.

Effect of the Invention

According to the invention of aspect 1, the member alignment preprocessing device aligns in advance the positions of bonding surfaces of the two members received by the member receiving device so as to approximately correspond, and the member alignment device aligns the two members so that the positions of the bonding surfaces of the two members correspond in accordance with the images of the two members captured by CCD cameras. Thus, the member alignment device can accurately and more quickly align the two members. In other words, the two members can accordingly be rapidly and accurately positioned for bonding, and a bonded member of good quality can be provided without misalignment of the two members.

According to the invention of aspect 2, in addition to the effect of the invention of aspect 1, the thickness of the bonded member is adjusted by the thickness adjusting device in accordance with the thickness of the two members measured by the thickness measuring device. Thus, the thickness of the adhesive in the bonded member, which is formed by bonding the two members, can be kept constant with the predetermined thickness, and thus the quality of the bonded member can be improved.

According to the invention of aspect 3, in addition to the effect of the invention of aspect 2, the member tilt adjusting device determines tilts of the members in accordance with the thicknesses of the members measured by the thickness measuring device at plural points, adjusts the members in $\alpha$, $\beta$, $\theta$-axis directions, and adjusts the tilts of the two members so that the members are kept level. Thus, the tilt or torsion of the bonded member can be corrected, and the member can be brought into level, even if the member has such tilt or torsion. Therefore, the thickness of adhesive can be kept nearly equal and constant, and the quality of the bonded member can be improved.

According to the invention of aspect 4, in addition to the effects of the invention of aspect 1 through aspect 3, the adhesive at the edge of the bonded member which is bonded is cured with the adhesive curing preprocessing device. Thus, the adhesive in the bonded member can be prevented from squeezing out of the edge of the bonded member, even in the state where the overall adhesive between the two members which are bonded fails to cure.

BRIEF DESCRIPTION OF DRAWINGS

FIGS. 4A-D are schematic drawings, showing an example of the member bonding device in the member bonding apparatus according to the first embodiment of the present invention.

BEST MODE FOR CARRYING OUT THE INVENTION

Figure 1:
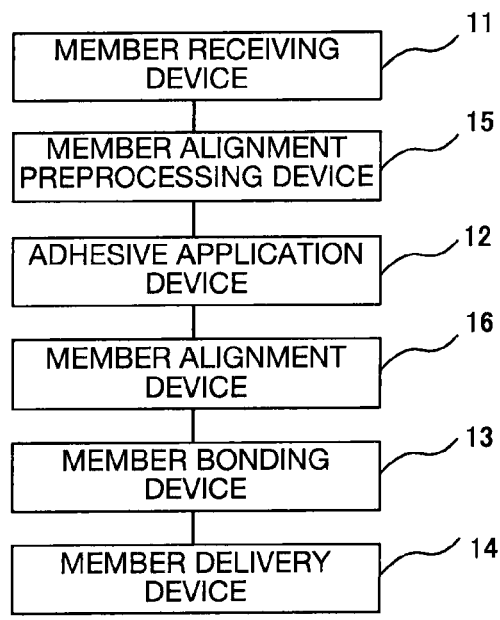
FIG. 1 is a block diagram, showing an example of the member bonding apparatus according to the first embodiment of the present invention.
Figure 14:
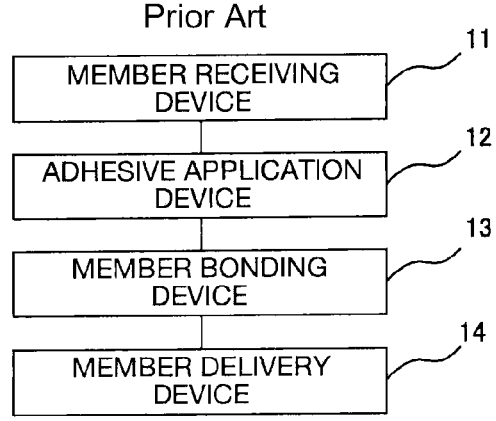
FIG. 14 is a block diagram, showing an example of the member bonding apparatus according to the conventional art.

A first embodiment of the present invention will be described hereinafter. FIG. 1 is a block diagram, showing an example of a member bonding apparatus according to the first embodiment of the present invention. The first embodiment is provided with, in addition to the prior art shown in FIG. 14, a member alignment preprocessing device 15 for aligning the positions of bonding surfaces of two members received by a member receiving device 11 so as to approximately correspond, and a member alignment device 16 for aligning the two members so that the positions of the bonding surfaces of the two members correspond in accordance with the images of the two members that are captured by mounted CCD cameras. The same elements as those in FIG. 14 are denoted with same reference numerals and symbols, and duplicating description is not repeated.

The member alignment preprocessing device 15 aligns the positions of bonding surfaces of the two members received by the member receiving device 11 so as to approximately correspond. The adhesive application device 12 applies an adhesive to the bonding surface of one of the two members that are approximately aligned by the member alignment preprocessing device 15. The member alignment device 16 aligns one member to which the adhesive is not applied with the other member to which the adhesive is applied.

The member bonding device 13 enables the bonding surfaces of the two members that are aligned by the member alignment device 16 to be bonded to each other through the adhesive. Therefore, since the member alignment preprocessing device 15 previously aligns the positions of bonding surfaces of the two members received by the member receiving device 11 so as to approximately correspond, the member alignment device 16 can accurately and quickly align the two members.

Figure 2:
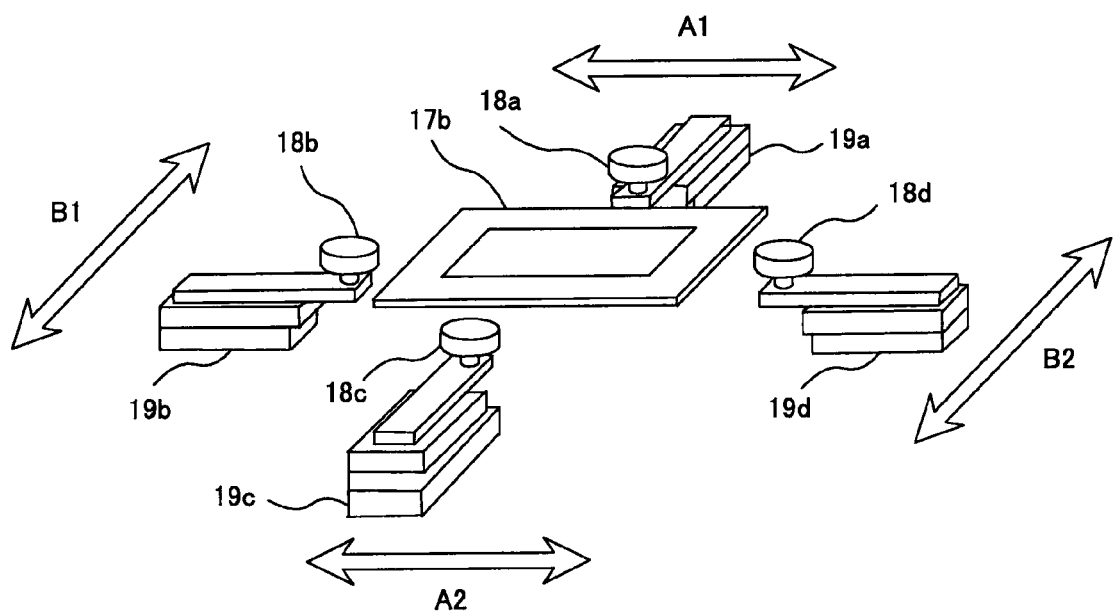
FIG. 2 is a schematic drawing, showing an example of the member alignment preprocessing device in the member bonding apparatus according to the first embodiment of the present invention.

FIG. 2 is a schematic drawing, showing an example of a member alignment preprocessing device 15 in the first embodiment of the present invention. FIG. 2 does not show one member 17a to which the adhesive is to be applied, but shows a case where the other member 17b to which the adhesive is not applied is aligned to the one member 17a.

As shown in FIG. 2, the member alignment preprocessing device 15 includes pushers 18a to 18d for independently pushing four sides of the other member 17b to align the other member 17b with the one member 17a (not shown). The pushers 18a to 18d are respectively driven by the pusher drive parts 19a to 19d. The pushers 18a, 18c adjusts the position in Y-axis direction shown with arrows B1, B2, and the pushers 18b, 18d adjusts the position in X-axis direction shown with arrows A1, A2.

As described above, the member alignment preprocessing device 15 aligns the positions of the bonding surfaces of the two members 17a, 17b so as to approximately correspond at a stage where the member receiving device 11 receives two members 17a, 17b. The adhesive application device 12 applies the amount of the adhesive of which the thickness becomes constant to the bonding surface of the one member 17a of the two members that the bonding positions are aligned to approximately correspond in advance by the member alignment preprocessing device 15. The member alignment device 16 is configured to accurately align the other member 17b to which the adhesive is not applied with the one member 17a to which the adhesive is applied. The member alignment device 16 captures the images of the two members with the CCD camera mounted on the member alignment device 16 and aligns two members 17a, 17b so that the positions of the bonding surfaces of the two members correspond in accordance with the captured images of the two members. Therefore, the member alignment device 16 starts the alignment of the two members 17a, 17b from the approximately corresponding positions, and the member alignment device 16 can accurately and more quickly align the two members.

The member bonding device 13 makes the bonding surfaces of the two members 17a, 17b that are aligned by the member alignment device 16 be bonded to each other through the adhesive. The two members 17a, 17b can accordingly be positioned for bonding with high accuracy, and a bonded member of good quality can be provided without misalignment of the two members 17a, 17b.

Figure 3:
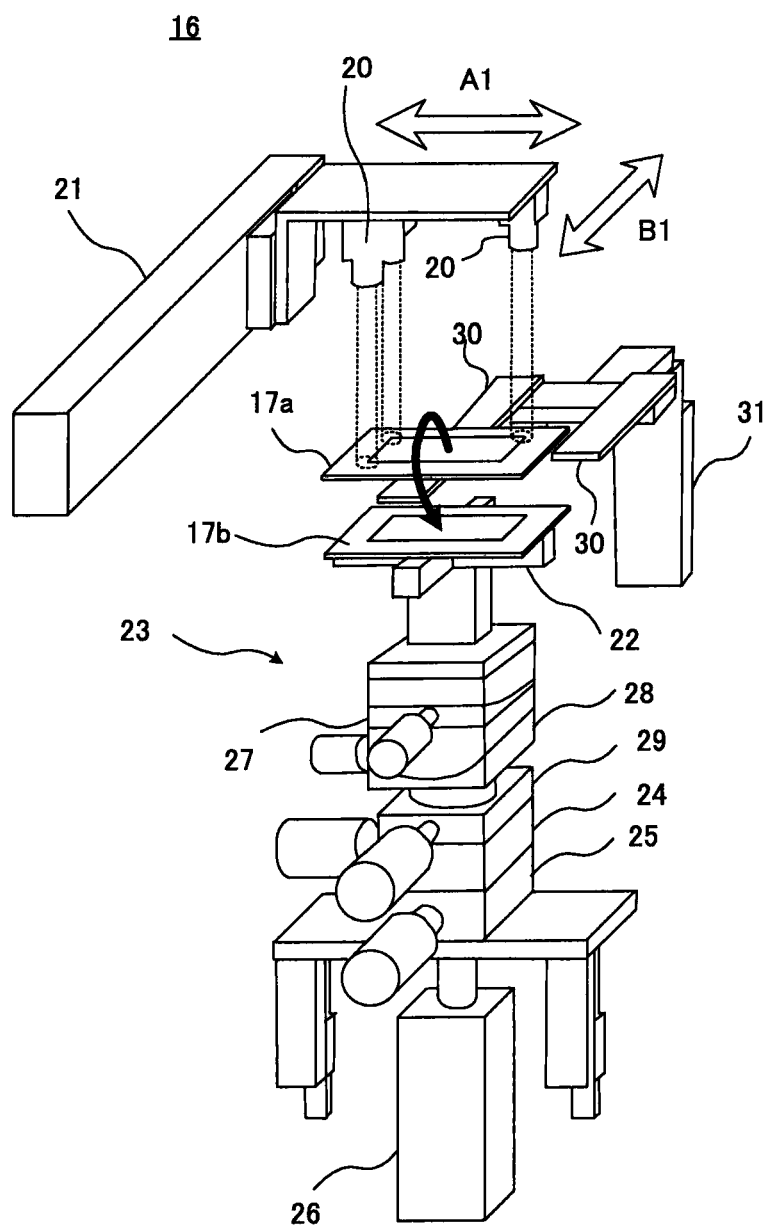
FIG. 3 is a schematic drawing, showing an example of the member alignment device in the member bonding apparatus according to the first embodiment of the present invention.

FIG. 3 is a schematic drawing of the member alignment device 16 according to the first embodiment of the present invention. The member alignment device 16 includes a plurality of CCD cameras 20. The CCD cameras 20 are controlled to be driven in direction of arrows A1, B1 (X-axis direction and Y-axis direction) by a CCD camera drive part 21 and capture the images of the two members 17a, 17b. The one member 17a of the two members 17a, 17b to which the adhesive is applied is rotated a half-turn by the member bonding device 13 described later and arranged above the other member 17b. The other member 17b to which the adhesive is not applied is placed on a member mount table 22 in the member bonding device 13. The member mount table 22 has a suction head, which suctions the other member 17b onto the member mount table 22.

The member mount table 22 is driven by the drive unit 23. The drive unit 23 has an X-axis drive part 24 for driving the member mount table 22 in X-axis direction, a Y-axis drive part 25 for driving the member mount table 22 in Y-axis direction, a Z-axis drive part 26 for driving the member mount table 22 in Z-axis direction, an α-axis drive part 27 for driving the member mount table 22 in X-axis rotational direction (rotation direction on a YZ-plane), a β-axis drive part 28 for driving the member mount table 22 in Y-axis rotational direction (rotation direction on a ZX-plane), a θ-axis drive part 29 for driving the member mount table 22 in Z-axis rotational direction (rotation direction on an XY-plane).

Two reflectors 30 are provided with different lengths. The reflectors 30 are provided to enhance contrast of the image captured by the CCD cameras 20 and driven by a reflector drive unit 31.

Figure 4A:
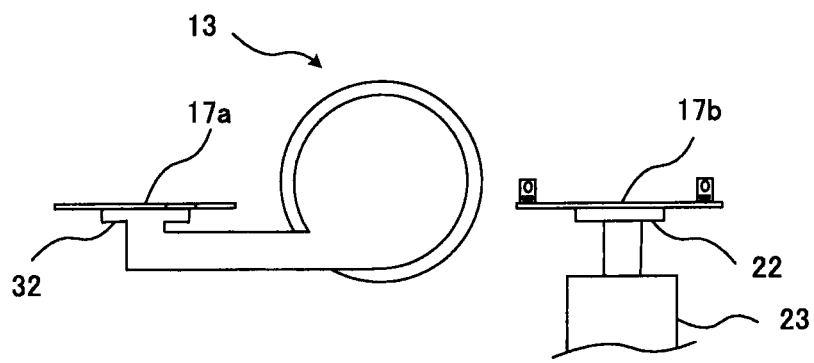
Figure 4A:
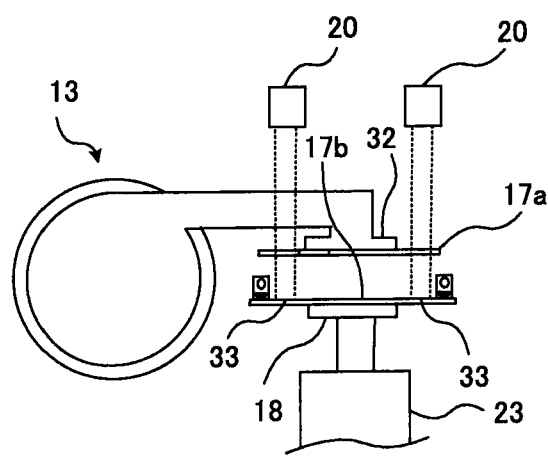
Figure 4A:
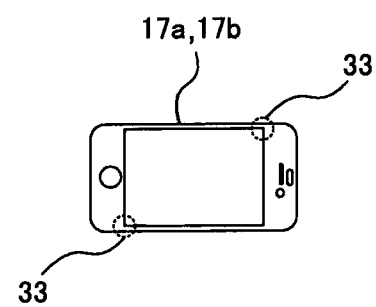
Figure 4D:
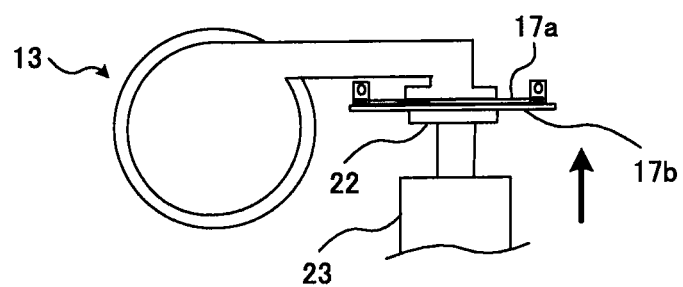

FIG. 4A and FIG. 4B are explanatory drawings for alignment of the two members 17a, 17b by the member alignment device 16. FIG. 4A is an explanatory drawing of a positional relation between the one member 17a and the other member 17b before alignment, FIG. 4B is an explanatory diagram of a state where the one member 17a is arranged above the other member 17b for alignment, FIG. 4C is a top view of the two members 17a, 17b during the alignment, and FIG. 4D is an explanatory drawing, showing a state where the two members 17a, 17b are bonded after the alignment.

As shown in FIG. 4A, the member bonding device 13 holds the one member 17a to which the adhesive is applied with a holding device 32. The holding device 32 includes the suction head, and the suction head suctions the one member 17a. On the other hand, the other member 17b is suctioned by the suction head and mounted on the member mount table 22 of the member alignment device 16.

An arm of the holding device 32 of the member bonding device 13 makes a half-turn from the state shown in FIG. 4A and arranges the one member 17a over the other member 17b as shown in FIG. 4B. The CCD cameras 20 then take to capture the images of the one member 17a and the other member 17b. At that time, the reflectors 30 are driven by the reflector drive unit 31 and enhance the contrast of the images of the two members 17a, 17b. Reference positions 33 for the bonding surface positions are aligned as shown in FIG. 4C. For example, when the two members 17a, 17b are a liquid crystal panel and a cover glass, respectively, corners of a display surface in the liquid crystal panel are set as the reference positions 33.

The alignment is performed such that a controller (not shown) drives the drive unit 23 shown in FIG. 3 in accordance with the images captured by the CCD cameras 20. That is to say, the alignment is performed through drive control of the member mount table 22 in X, Y, Z-axis directions and α, β, θ-axis directions. After the alignment is completed, the Z-axis drive part 26 of the drive unit 23 lifts the member mount table 22 upward, and the bonding surfaces of the two members 17a, 17b are bonded through the adhesive.

In the first embodiment of the present invention as described above, the two members 17a, 17b are aligned using the CCD cameras 20 so that the positions of the bonding surfaces of the two members 17a, 17b correspond or coincide with each other, and thus the two members can be positioned for bonding with high accuracy, and a bonded member of good quality can be provided without misalignment of the two members 17a, 17b.

Figure 5:
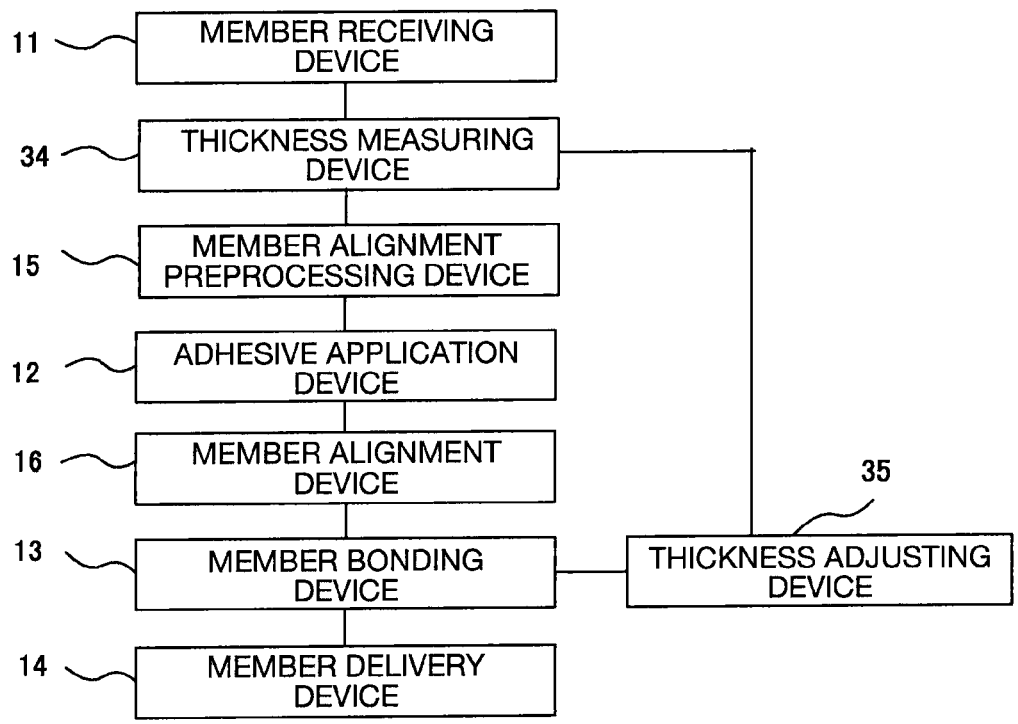
FIG. 5 is a schematic drawing, showing an example of the member alignment preprocessing device in the member bonding apparatus according to the second embodiment of the present invention.

A second embodiment of the present invention will be described next. FIG. 5 is a block diagram, showing an example of a member bonding apparatus according to the second embodiment of the present invention. The second embodiment is provided with, in addition to the first embodiment shown in FIG. 1, a thickness measuring device 34 for measuring the thicknesses of the two members received by the member receiving device 11, and a thickness adjusting device 35 for adjusting the thickness of the bonded member in accordance with the thicknesses of the two members measured by the thickness measuring device 34 so that the thickness of the adhesive in the bonded member, which is formed when the two members aligned by the member alignment device 16 are bonded, achieves the predetermined thickness. The same elements as those in FIG. 1 are denoted with same reference numerals and symbols, and duplicating description is not repeated.

In FIG. 5, the thickness measuring device 34 measures each thickness of the two members received by the member receiving device 11. The member alignment preprocessing device 15 then adjusts to align one of the two members measured by the thickness measuring device 34 with the other member in X, Y-axis directions so that the positions of the bonding surfaces of the two members approximately correspond.

The adhesive application device 12 applies the amount of the adhesive the thickness of which becomes constant to the bonding surface of the one member of the two members that the bonding positions are aligned to approximately correspond by the member alignment preprocessing device 15. The member alignment device 16 adjusts to align the one member of the two members with the other member in X, Y, Z-axis directions and α, β, θ-axis directions in accordance with the images of the two members captured by the mounted CCD cameras so that the positions of the bonding surfaces of the two members correspond.

The thickness adjusting device 35 adjusts the thickness of the bonded member in accordance with the thicknesses of the two members measured by the thickness measuring device 34 so that the thickness of the adhesive in the bonded member, which is formed when the two members aligned by the member alignment device 16 are bonded, achieves the predetermined thickness. The member bonding device 13 makes the bonding surfaces of the two members be bonded through the adhesive so that the bonded member has a thickness adjusted by the thickness adjusting device 35. The member delivery device 14 unloads and delivers the bonded member bonded in the member bonding device 13.

As described above, the thickness adjusting device 35 adjusts the thickness of the bonded member so that the thickness of the adhesive in the bonded member, which is formed when the two members are bonded, achieves the predetermined thickness. In other words, instead of adjusting the thickness of the bonded member so that the thickness of the bonded member, which is formed when the two members are bonded, becomes constant as a conventional art, this embodiment adjusts the thickness of the bonded member so that the thickness of the adhesive achieves the predetermined thickness. The member bonding device 13 makes the bonding surfaces of the two members the thicknesses of which are adjusted by the thickness adjusting device 35 be bonded through the adhesive, and thus the thickness of the adhesive can be kept constant, and the quality of the bonded member can be improved.

Figure 6:
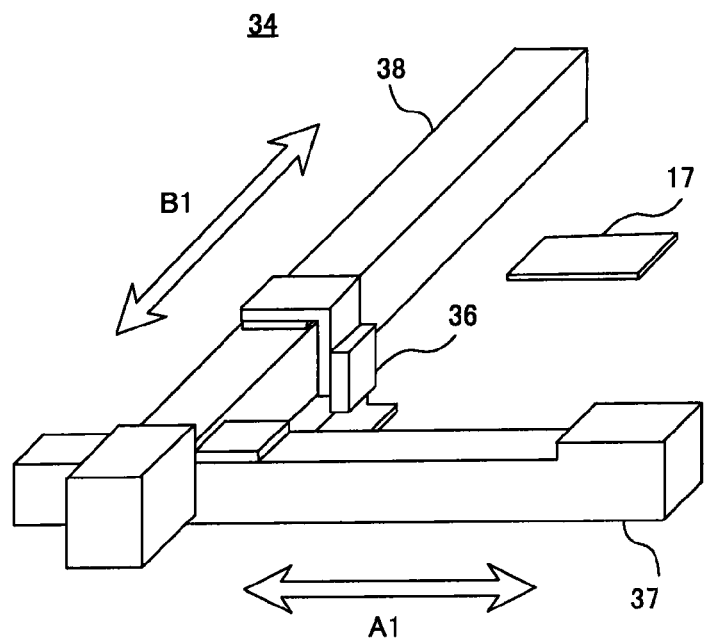
FIG. 6 is a schematic drawing of the thickness measuring device in the member bonding apparatus according to the second embodiment of the present invention.

The thickness measuring device 34 will be described next. FIG. 6 is a schematic drawing of the thickness measuring device 34. The thickness measuring device 34 measures the thicknesses of the two members received by the member receiving device 11 and has a thickness measuring instrument 36 which measures the thickness of the member 17.

The thickness measuring instrument 36 is a laser displacement gage, for example. FIG. 6 shows a case where a single member 17 is illustrated.

The thickness measuring instrument 36 is moved to the position of the member 17 by an X-axis drive mechanism 37 and a Y-axis drive mechanism 38. FIG. 6 shows a case where the thickness measuring instrument 36 is mounted on the Y-axis drive mechanism 38. The X-axis drive mechanism 37 drives the Y-axis drive mechanism 38 in the direction of an arrow A1 (X-axis direction), the Y-axis drive mechanism 38 drives the Y-axis drive mechanism 38 itself in the direction of an arrow B1 (Y-axis direction), and thus the thickness measuring instrument 36 travels. Then, the thickness measuring instrument 36 detects the thickness of the member 17 and outputs the detected thickness of the member 17 to the thickness adjusting device 35.

Figure 7A:
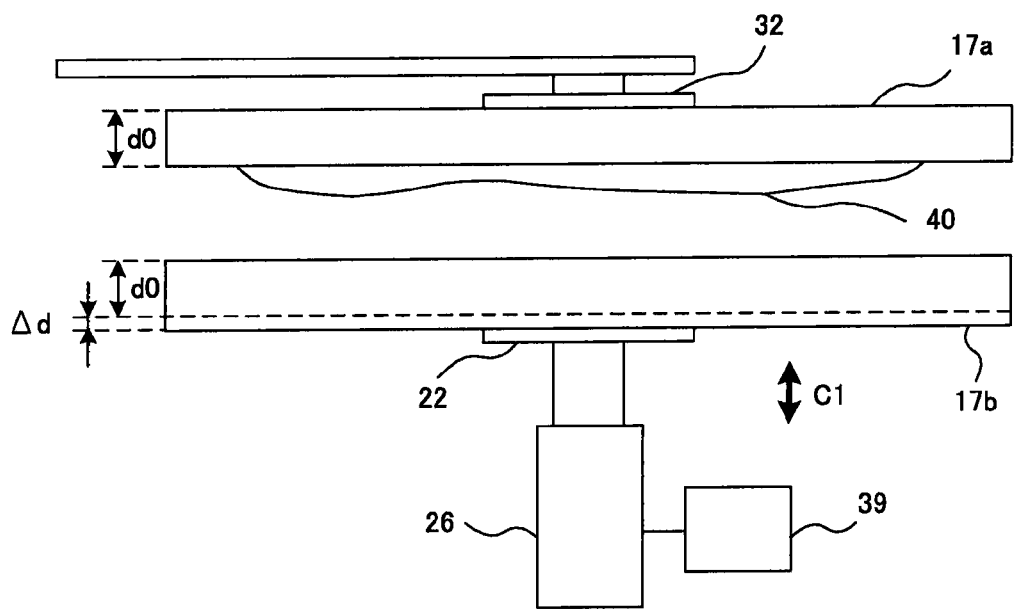
FIGS. 7A and 7B are schematic drawings of the thickness adjustment device in the member bonding apparatus according to the second embodiment of the present invention.
Figure 7B:
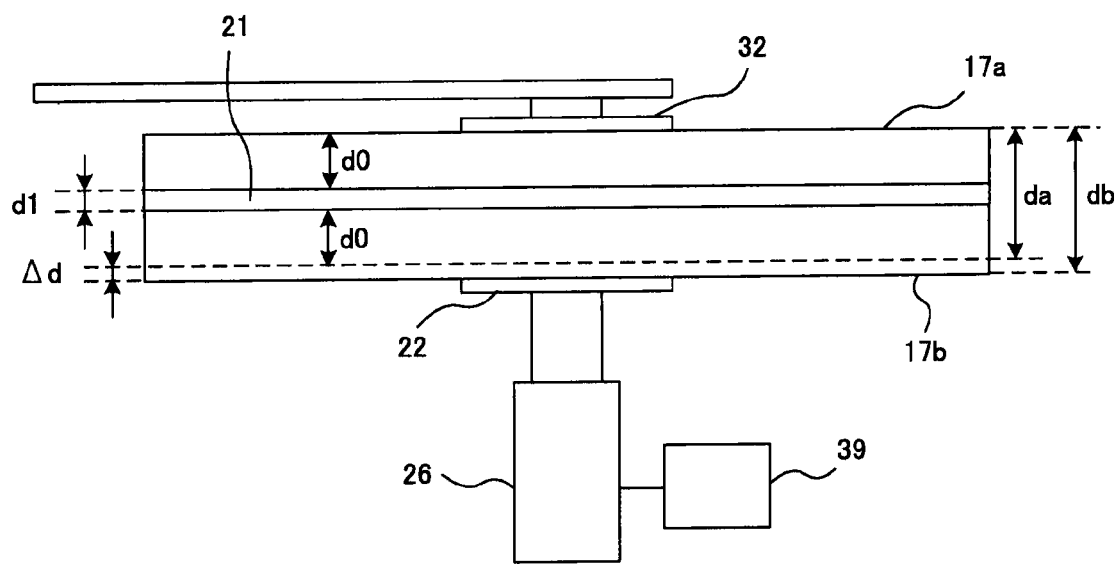

The thickness adjusting device 35 will be described next. FIG. 7A and FIG. 7B are explanatory drawings of the thickness adjusting device 35. FIG. 7A shows a state before the one member 17a and the other member 17b are bonded, and FIG. 7B shows a state after the one member 17a and the other member 17b are bonded. The thickness adjusting device 35 is configured including a member mount table drive control part 39 for driving and controlling the Z-axis drive part 26 of the member alignment device 16 shown in FIG. 3. The thickness adjusting device 35 drives and controls the Z-axis drive part 26 of the member alignment device 16 by the member mount table drive control part 39 and adjusts the thickness of the bonded member so that the thickness of the adhesive in the bonded member, which is formed when the two members are bonded, achieves the predetermined thickness.

FIG. 7A shows a case where the thickness of the one member 17a to which the adhesive 40 is applied is a member reference thickness d0, the thickness of the other member 17b has Δd thicker than the member reference thickness d0, and the one member 17a is held by the holding device 32 of the member bonding device 13 and arranged or positioned over the other member 17b mounted on the member mount table 22 of the member bonding device 13. The member mount table 22 is driven in up-and-down directions (in the direction of an arrow C1) by the member mount table drive part 39, which drives and controls the Z-axis drive part 26 of the member alignment device 16.

In other words, the member bonding device 13 drives to move the member mount table 22 upward with the member mount table drive part 39 and allows the other member 17b mounted on the member mount table 22 to be bonded to the one member 17a held by the holding device 32 when the bonding surfaces of the two members 17a, 17b are bonded. At that time, the bonding surfaces of the two members are bonded through the adhesive 40 so that the thickness of the bonded member becomes a bonded member reference thickness adjusted by the thickness adjusting device 35.

FIG. 7B shows a state after the one member 17a and the other member 17b are bonded. When both the one member 17a and the other member 17b have the bonded member reference thickness d0, the thicknesses are adjusted so that the thickness of the bonded member achieves the bonded member reference thickness da, and then the two members 17a, 17b are bonded. In this case, the adhesive applied by the adhesive application device 12 has the amount where the thickness of the adhesive 40 becomes an adhesive reference thickness d1, and thus the thickness of the adhesive 40 can be set to the adhesive reference thickness d1 through a thickness adjustment such that the thickness of the bonded member achieves the bonded member reference thickness da.

On the other hand, when the thickness of the other member 17b is thicker by Δd than the member reference thickness d0, the thicknesses are adjusted so that a target value of the thickness of the bonded member is determined as a bonded member target thickness db which is thicker by Δd than the bonded member reference thickness da and the thickness of the bonded member achieves the bonded member target thickness db (=da+Δd), and then the two members 17a, 17b are bonded. The thickness of the adhesive 40 can achieve the adhesive reference thickness d1 accordingly.

The above description is made in the case where the other member 17b is thicker than the member reference thickness d0. However, the same wayt can be applied to a case where the other member 17b is thinner than the member reference thickness d0. In addition, the above-described way may be applied to a case where the one member 17a is thicker or thinner than the member reference thickness d0 and where both the one member 17a and the other member 17b are thicker or thinner than the member reference thickness d0.

In the second embodiment as described above, the thickness of the adhesive 40 in the bonded member, which is formed when the two members 17a, 17b are bonded, is adjusted to achieve the predetermined thickness d1, and thus the thickness of the adhesive 40 can be kept constant even if the two members 17a, 17b which are bonded have variations in thickness. The quality of the bonded member can be improved accordingly.

Figure 8:
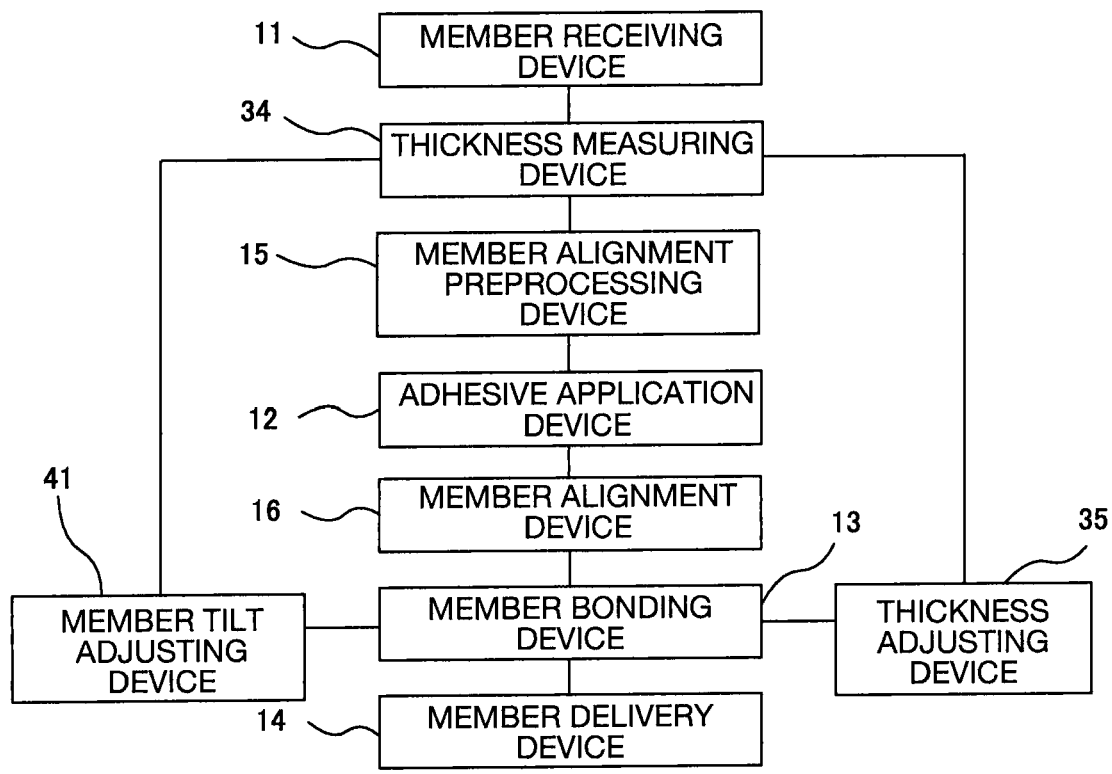
FIG. 8 is a schematic drawing, showing another example of the member alignment preprocessing device in the member bonding apparatus according to the second embodiment of the present invention.

FIG. 8 is a block diagram, showing another example of the member bonding apparatus according to the second embodiment of the present invention. This example of the second embodiment is provided with, in addition to the example of the member bonding apparatus according to the second embodiment shown in FIG. 5, a member tilt adjusting device 41 for adjusting a tilt of the member in accordance with the thicknesses of the two members measured by the thickness measuring device 34 at plural points. The same elements as those in FIG. 5 are denoted with same reference numerals and symbols, and duplicating description is not repeated.

In FIG. 8, the member tilt adjusting device 41 determines the tilt of the member in accordance with the thicknesses of the members measured by the thickness measuring device 34 at plural points and adjusts the tilt of the member so that the member is kept level. The member bonding device 13 then makes the bonding surfaces of the two members be bonded at the tilt position of the member adjusted by the member tilt adjusting device 41.

Figure 9:
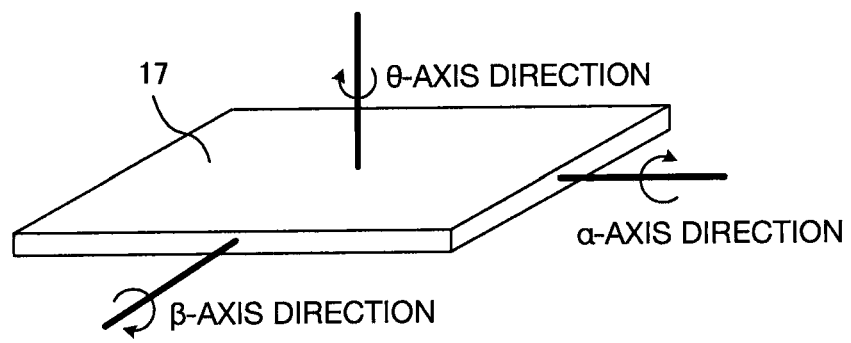
FIG. 9 is an explanatory diagram of tilt adjustment for the member with the member tilt adjusting device in the member bonding apparatus according to the second embodiment of the present invention.

FIG. 9 is an explanatory drawing of tilt adjustment for the member with the member tilt adjusting device in the member bonding apparatus according to the second embodiment of the present invention. The member tilt adjusting device 41 is made up including the member mount table drive control part for driving and controlling the α-axis drive part 27, the β-axis drive part 28, and the θ-axis drive part 29 of the member alignment device 16 shown in FIG. 3. The member tilt adjusting device 41 adjusts the positions of the holding device 32 holding the one member and the member mount table 22 bearing the other member thereon.

As shown in FIG. 9, the member tilt adjusting device 41 drives and controls the α-axis drive part 27 that drives in the X-axis rotational direction (rotation direction on the YZ-plane), the β-axis drive part 28 that drives in the Y-axis rotational direction (rotation direction on the ZX-plane), the θ-axis drive part 29 that drives in the Z-axis rotational direction (rotation direction on the XY-plane) in XYZ-space with the member mount table drive control part (not shown) and thus corrects the tilt or torsion of the member 17.

In other words, the tilt of the member is judged in accordance with the thicknesses of the members measured by the thickness measuring device 34 at plural points and adjusts the α-axis direction, the β-axis direction, and the θ-axis direction so that the member is brought into level as compared with the aforementioned example. Therefore, the member can be kept nearly level even if the member has any tilt or torsion, and the thickness of adhesive can be kept nearly equal and constant.

Figure 10:
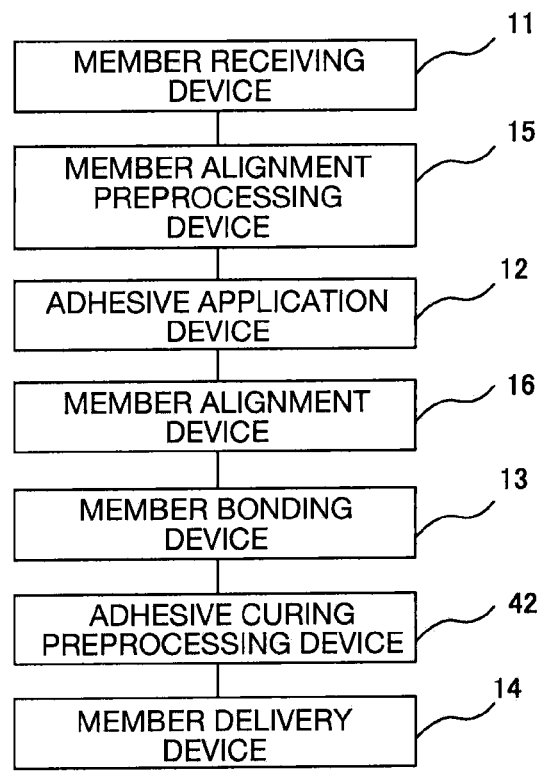
FIG. 10 is a block diagram, showing an example of the member bonding apparatus according to the third embodiment of the present invention.

A third embodiment of the present invention will be described next. FIG. 10 is a block diagram, showing an example of a member bonding apparatus according to the third embodiment of the present invention. The third embodiment is provided with, in addition to the first embodiment shown in FIG. 1, an adhesive curing preprocessing device 42 for curing the adhesive at the edge of the bonded member which is bonded with the member bonding device 13. The same elements as those in FIG. 1 are denoted with same reference numerals and symbols, and duplicating description is not repeated.

The member receiving device 11 receives the two members, the member alignment preprocessing device 15 aligns the two members so that the positions of the bonding surfaces approximately correspond, the adhesive application device 12 applies the adhesive to the bonding surface of one member of the two members, and the member alignment device 16 aligns the two members so that the positions of the bonding surfaces of the two members accurately correspond. Then, the member bonding device 13 makes the one member and the other member be bonded. The bonded member is formed accordingly.

The adhesive curing preprocessing device 42 is configured to cure the adhesive at the edge of the bonded member which is bonded with the member bonding device 13 and allows to cure the adhesive only at the edge of the bonded member in advance on the member bonding device 13 even in a state where the overall adhesive between the two members which are bonded fails to cure. Thus, the adhesive in the bonded member can be prevented from squeezing out of the edge of the bonded member, even in the state where the overall adhesive between the two members which are bonded fails to cure.

Figure 11A:
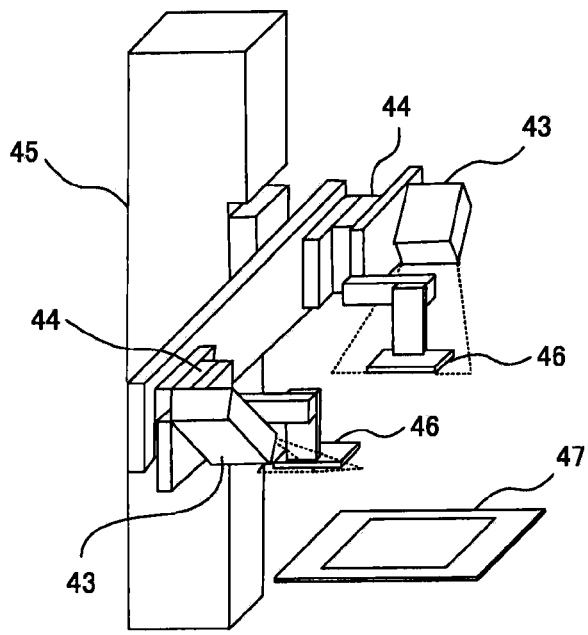
FIGS. 11A and 11B are schematic drawings of the adhesive curing preprocessing device in the member bonding apparatus according to the third embodiment of the present invention.
Figure 11B:
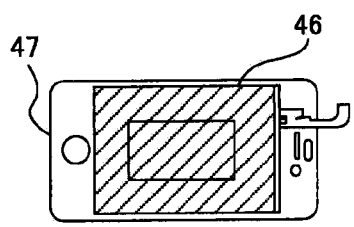

FIG. 11A and FIG. 11B are explanatory diagrams of the adhesive curing preprocessing device 42. FIG. 11A is a schematic drawing of the adhesive curing preprocessing device 42, and FIG. 11B is a plan view of the bonded member 47 during the preprocessing of adhesive curing. As shown in FIG. 11A, the adhesive curing preprocessing device 42 has an adhesive curing device 43 for curing the adhesive. In the case where a liquid material in which a solid polymer content such as a synthetic adhesive is dissolved in a solvent is used as the adhesive, the irradiation of ultraviolet (UV) light, for example, causes an increase in viscosity of the adhesive and a decrease in flowability depending UV intensity. Thus, a UV irradiation device is used as the adhesive curing device 43.

The adhesive curing device 43 is mounted to the Z-axis drive mechanism 45 through a curing device drive part 44 and irradiates the edge of the bonded member 47 with ultraviolet light through a mask 46. The curing device drive part 44 adjusts the positions of the adhesive curing device 43 and the mask 46 so that the edge of the member 47 is irradiated by the ultraviolet light from the adhesive curing device 43. In addition, the Z-axis drive mechanism 45 adjusts the positions of the adhesive curing device 43 and the mask 46 in vertical direction (Z-axis direction).

As shown in FIG. 11B, the part of the bonded member 47 covered with the mask 46 is not irradiated by the ultraviolet light, and thus the adhesive at the edge of bonded member 47 which is not covered with the mask 46 cures in advance. Therefore, the adhesive in the bonded member can be prevented from squeezing out of the edge of the bonded member, even in the state where the overall adhesive between the two members which are bonded fails to cure.

Figure 12:
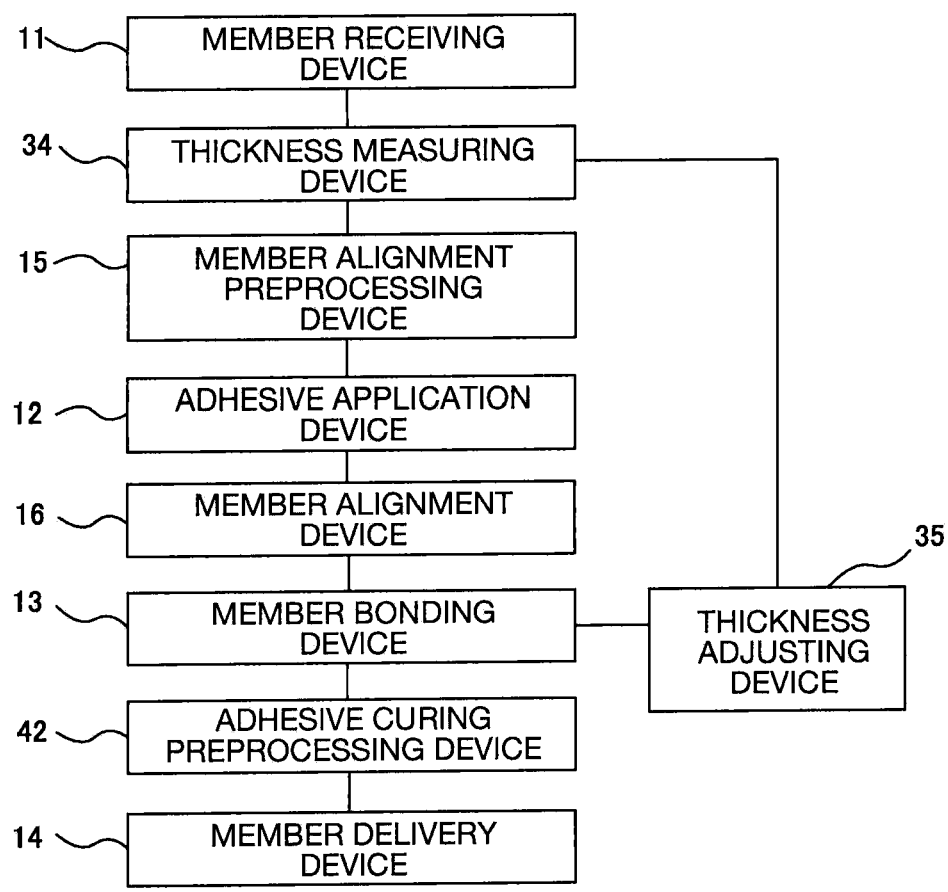
FIG. 12 is a block diagram, showing another example of the member bonding apparatus according to the third embodiment of the present invention.

FIG. 12 is a block diagram, showing another example of the member bonding apparatus according to the third embodiment of the present invention. This example is provided with, in addition to one example of the member bonding apparatus according to the third embodiment shown in FIG. 10, the thickness measuring device 34 for measuring the thicknesses of the two members received by the member receiving device 11, and the thickness adjusting device 35 for adjusting the thickness of the bonded member in accordance with the thicknesses of the two members measured by the thickness measuring device 34 so that the thickness of the adhesive in the bonded member, which is formed when the two members aligned by the member alignment device 16 are bonded, achieves the predetermined thickness. The same elements as those in FIG. 10 are denoted with same reference numerals and symbols, and duplicating description is not repeated.

As shown in FIG. 12, the member receiving device 11 receives the two members, and the thickness measuring device 34 measures each thickness of the two members received by the member receiving device 11. Then, the member alignment preprocessing device 15 aligns the two members so that the positions of the bonding surfaces approximately correspond, the adhesive application device 12 applies the adhesive to the bonding surface of one member of the two members, and the member alignment device 16 aligns the two members so that the positions of the bonding surfaces of the two members accurately correspond.

In addition, the thickness adjusting device 35 adjusts the thickness of the bonded member in accordance with the thicknesses of the two members measured by the thickness measuring device 34 so that the thickness of the adhesive in the bonded member, which is formed when the two members aligned by the member alignment device 16 are bonded, achieves or becomes the predetermined thickness. The member bonding device 13 makes the bonding surfaces of the two members be bonded through the adhesive so that the bonded member has the thickness adjusted by the thickness adjusting device 35. The member delivery device 14 unloads and delivers the bonded member bonded in the member bonding device 13.

The two members can accordingly be positioned for bonding with rapidity and high accuracy, and a bonded member of good quality can be provided without misalignment of the two members. The thickness of the adhesive in the bonded member, which is formed when the two members are bonded, can be kept constant to be the predetermined thickness, and thus the quality of the bonded member can be improved. Furthermore, the adhesive in the bonded member can be prevented from squeezing out of the edge of the bonded member, even in the state where the overall adhesive between the two members which are bonded is not yet cured.

Figure 13:
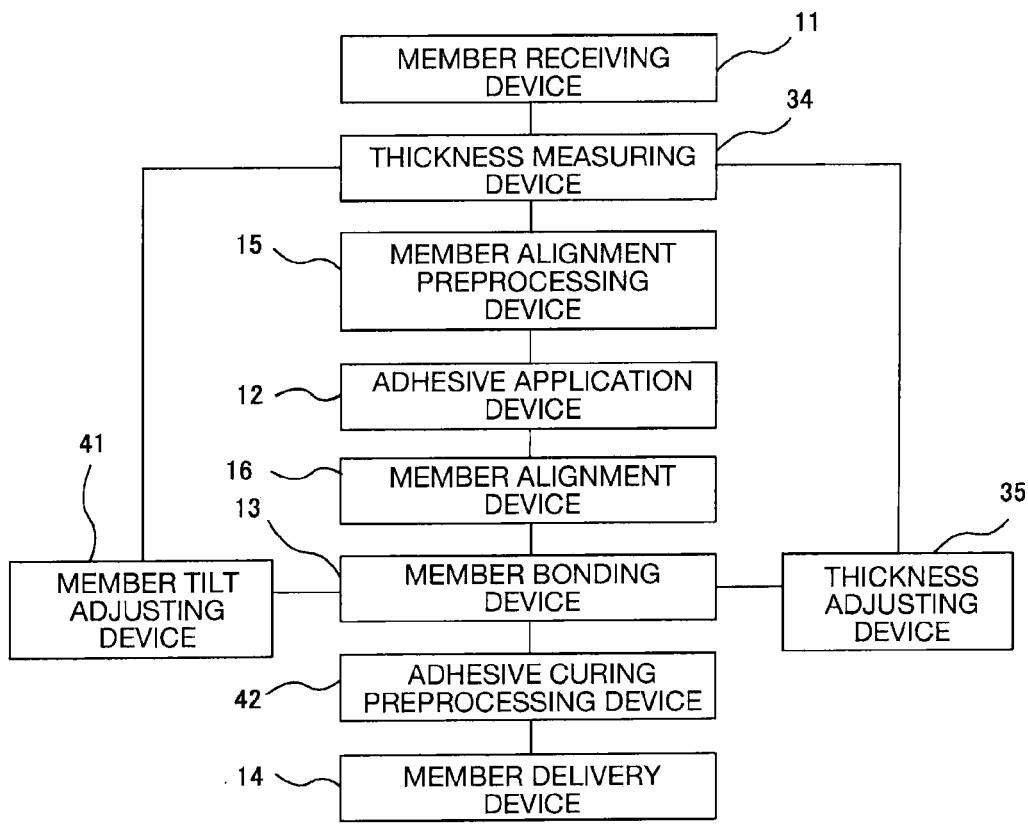
FIG. 13 is a block diagram, showing yet another example of the member bonding apparatus according to the third embodiment of the present invention.

FIG. 13 is a block diagram, showing yet another example of the member bonding apparatus according to the third embodiment of the present invention. This example is provided with, in addition to another example of the member bonding apparatus according to the third embodiment shown in FIG. 12, the member tilt adjusting device 41 for determining the tilts of the members, adjusting the members in α, β, θ-axis directions, and adjusting the tilts of the two members so that the members are kept level, in accordance with the thicknesses of the members measured by the thickness measuring device 34 at plural points. The same elements as those in FIG. 12 are denoted with same reference numerals and symbols, and duplicating description is not repeated.

The member bonding device 13 makes the bonding surfaces of the two members be bonded through the adhesive so that the bonded member has the thickness adjusted by the thickness adjusting device 35 at the tilt position of the member adjusted by the member tilt adjusting device 41. Thus, in addition to the effectiveness of another example of the member bonding apparatus according to the third embodiment shown in FIG. 12, yet another example enables to correct the tilt or torsion of the bonded member and to bring the member into level as compared with the aforementioned example, even if the member has any tilt or torsion. Therefore, the thickness of adhesive can be kept nearly equal and constant, and the quality of the bonded member can be improved.

While the present invention has been described in detail with reference to embodiments thereof, it is to be understood that those embodiments are merely illustrative and the scope of the present invention are not intended to be limited to those embodiments. Those novel embodiments can be put into practice with various modes, and any elimination, replacement, change or other modification can be made without departing from the scope of the invention. Those embodiments or other modifications fall within the scope of the invention and also within the scope of the claims and the equivalent range of the claims.

DESCRIPTION OF REFERENCE NUMERALS AND SYMBOLS

11: member receiving device
12: adhesive application device
13: member bonding device
14: member delivery device,
15: member alignment preprocessing device
16: member alignment device
17: member
18: pusher
19: pusher drive part
20: CCD camera
21: CCD camera drive part
22: member mount table
23: drive unit
24: X-axis drive part
25: Y-axis drive part
26: Z-axis drive part
27: α-axis drive part
28: β-axis drive part
29: θ-axis drive part
30: reflector
31: reflector drive unit
32: holding device
33: reference position
34: thickness measuring device
35: thickness adjusting device
36: thickness measuring instrument
37: X-axis drive mechanism
38: Y-axis drive mechanism
39: member mount table drive control part
40: adhesive
41: member tilt adjusting device
42: curing preprocessing device
43: adhesive curing device
44: curing device drive part
45: Z-axis drive mechanism
46: mask
47: bonded member

The invention claimed is:

1. A member bonding apparatus, comprising:
a member alignment preprocessing device for adjusting to align one member of two members to be bonded with another member in X and Y-axis directions so that the positions of bonding surfaces of the two members approximately correspond;
a member alignment device for adjusting to align one member of the two members with another member in X, Y, Z-axis directions and α, β, θ-axis directions in accordance with images of the two members captured by a mounted CCD camera so that positions of the bonding surfaces of the two members correspond;
a member bonding device for making the bonding surfaces of the two members aligned by the member alignment device be bonded to each other through an adhesive, the adhesive being applied to the bonding surface of one of the two members; and
an adhesive curing preprocessing device for irradiating an edge of the bonded member, bonded with the member bonding device, with ultraviolet light through a mask and curing the adhesive at the edge of the bonded member,
wherein the adhesive curing preprocessing device includes the mask and an ultraviolet light source for generating the ultraviolet light, and the mask is shaped in rectangle to cover over all of the bonded member except the edge of the bonded member.

2. A member bonding apparatus, comprising:
a thickness measuring device for measuring thicknesses of two members to be bonded;
a member alignment preprocessing device for adjusting to align one member of the two members measured by the thickness measuring device with another member in X, Y-axis directions so that the positions of bonding surfaces of the two members approximately correspond;
a member alignment device for adjusting to align one member of the two members with another member in X, Y, Z-axis directions and α, β, θ-axis directions in accordance with images of the two members captured by a mounted CCD camera so that the positions of the bonding surfaces of the two members correspond;
a thickness adjusting device for adjusting a thickness of a bonded member in accordance with the thicknesses of the two members measured by the thickness measuring device so that a thickness of an adhesive in the bonded member, the adhesive being applied to the bonding surface of one of the two members, the bonded member being formed when two members aligned by the member alignment device are bonded, achieves a predetermined thickness;
a member bonding device for making the bonding surfaces of the two members be bonded through the adhesive so that the bonded member has a thickness adjusted by the thickness adjusting device; and
an adhesive curing preprocessing device for irradiating an edge of the bonded member, bonded with the member bonding device, with ultraviolet light through a mask and curing the adhesive at the edge of the bonded member, wherein the adhesive curing preprocessing device includes the mask and an ultraviolet light source for generating the ultraviolet light, and the mask is shaped in rectangle to cover over all of the bonded member except the edge of the bonded member.

3. A member bonding apparatus, comprising:

a thickness measuring device for measuring thicknesses of two members to be bonded;

a member alignment preprocessing device for adjusting to align one member of the two members measured by the thickness measuring device with another member in X, Y-axis directions so that the positions of bonding surfaces of the two members approximately correspond;

a member alignment device for adjusting to align one member of the two members with another member in X, Y, Z-axis directions and $\alpha$, $\beta$, $\theta$-axis directions in accordance with images of the two members captured by a mounted CCD camera so that the positions of the bonding surfaces of the two members correspond;

a thickness adjusting device for adjusting a thickness of a bonded member in accordance with the thicknesses of the two members measured by the thickness measuring device so that a thickness of an adhesive in the bonded member, the adhesive being applied to the bonding surface of one of the two members, the bonded member being formed when the two members aligned by the member alignment device are bonded, achieves a predetermined thickness;

a member tilt adjusting device for determining tilts of the members, adjusting the members in $\alpha$, $\beta$, $\theta$-axis directions, and adjusting the tilts of the two members so that the members are kept level, in accordance with the thicknesses of the members measured by the thickness measuring device at plural points;

a member bonding device for making the bonding surfaces of the two members be bonded through the adhesive so that the bonded member has the thickness adjusted by the thickness adjusting device at tilt positions of the member adjusted by the member tilt adjusting device; and an adhesive curing preprocessing device for irradiating an edge of the bonded member, bonded with the member bonding device, with ultraviolet light through a mask and curing the adhesive at the edge of the bonded member, wherein the adhesive curing preprocessing device includes the mask and an ultraviolet light source for generating the ultraviolet light, and the mask is shaped in rectangle to cover over all of the bonded member except the edge of the bonded member.

* * * * *